(12) United States Patent
Huang

(10) Patent No.: US 9,039,292 B1
(45) Date of Patent: May 26, 2015

(54) OPTICAL FIBER CONNECTOR

(71) Applicant: HON HAI PRECISION INDUSTRY CO., LTD., New Taipei (TW)

(72) Inventor: Po-Wei Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/144,576

(22) Filed: Dec. 31, 2013

(30) Foreign Application Priority Data

Nov. 30, 2013 (CN) .......................... 2013 1 0621726

(51) Int. Cl.
*G02B 6/36* (2006.01)
*G02B 6/42* (2006.01)

(52) U.S. Cl.
CPC ............ *G02B 6/4231* (2013.01); *G02B 6/4212* (2013.01)

(58) Field of Classification Search
USPC ...................................... 385/72–85
See application file for complete search history.

(56) References Cited

U.S. PATENT DOCUMENTS

| | | | |
|---|---|---|---|
| 2004/0228584 A1* | 11/2004 | Dudek et al. ..................... | 385/89 |
| 2007/0281538 A1* | 12/2007 | Elliott et al. .................. | 439/405 |
| 2011/0222818 A1* | 9/2011 | Mune et al. ..................... | 385/72 |
| 2011/0243507 A1* | 10/2011 | Kim et al. ........................ | 385/78 |
| 2012/0100739 A1* | 4/2012 | Ton ............................... | 439/278 |
| 2013/0336619 A1* | 12/2013 | Son et al. ........................ | 385/89 |

* cited by examiner

*Primary Examiner* — Eric Wong
(74) *Attorney, Agent, or Firm* — Novak Druce Connolly Bove + Quigg LLP

(57) ABSTRACT

An optical fiber connector includes a first optical-electric coupling element, a second optical-electric coupling element and an elastic location cap. The first optical-electric coupling element includes a location post. The second optical-electric coupling element defines a location hole. The elastic location cap defines a receiving hole. A length of the location post is greater than a length of the location hole. The location post is inserted into the location post to assemble the first optical-electric coupling element to the second optical-electric coupling element, with an exposed portion of the location post exposing out of the location hole. The elastic location cap caps the location post with the exposed portion received in the receiving hole.

13 Claims, 3 Drawing Sheets

OPTICAL FIBER CONNECTOR

BACKGROUND

1. Technical Field

The present disclosure relates to connectors, and particularly to an optical fiber connector.

2. Description of Related Art

An optical connector includes a laser diode for emitting optical signals, a first optical transmission assembly, a second optical transmission assembly coupled with the first optical transmission assembly, and a photo diode. The optical signals emitted from the laser diode enter the first optical transmission assembly, and are transmitted through the second optical transmission assembly to the photo diode, and finally can be converted into electrical signals by the photo diode.

The first optical transmission assembly includes a number of first coupling lenses, and the second optical assembly includes a number of second coupling lenses for coupling the first coupling lenses to allow optimum signal transmittance. The first optical transmission assembly has to be mechanically and precisely engaged and configured with the second optical transmission assembly via a plurality of positioning holes and positioning posts to ensure the lenses are precisely aligned with the optical fibers. However, it is difficult to consistently align the positioning holes and the positioning posts together, which may result in lowered coupling precision between the coupling lenses and the optical fibers, and thus poor optical signals transmittance.

Therefore, it is desirable to provide an optical fiber connector which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
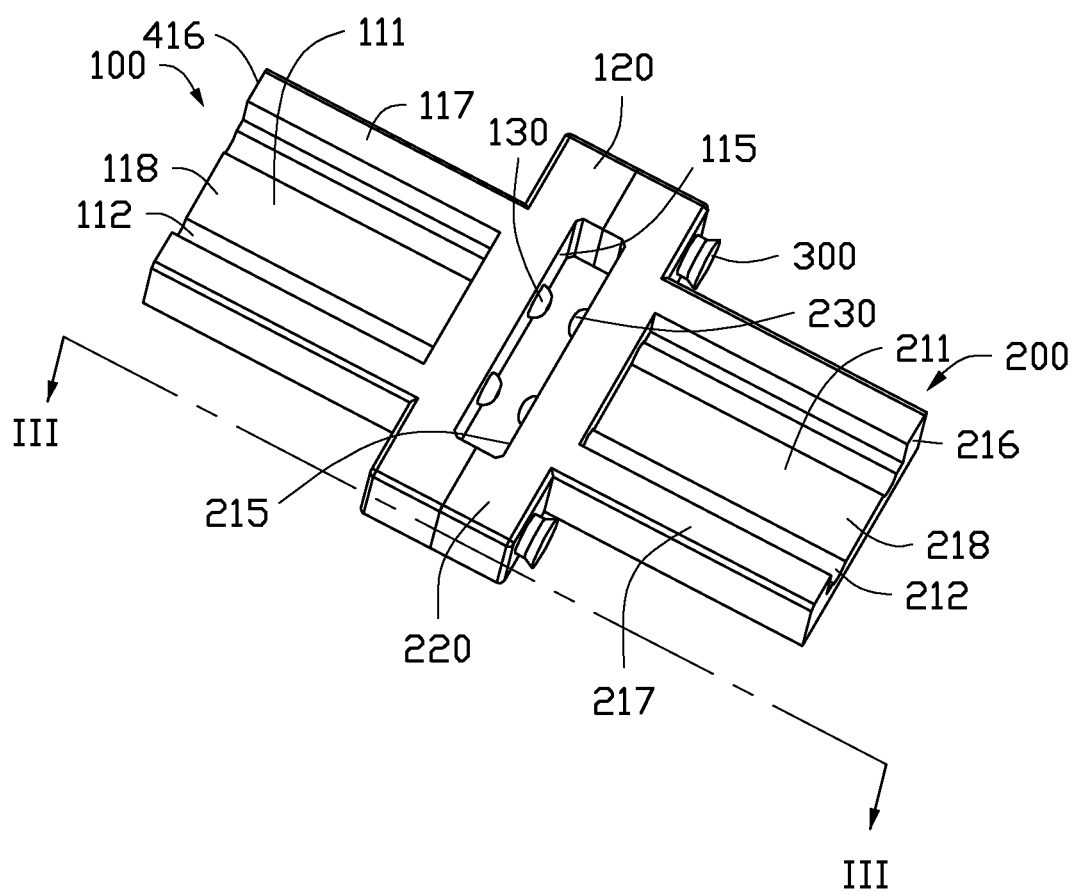
FIG. 1 is an assembled, isometric view of an optical fiber connector, according to an exemplary embodiment.
Figure 2:
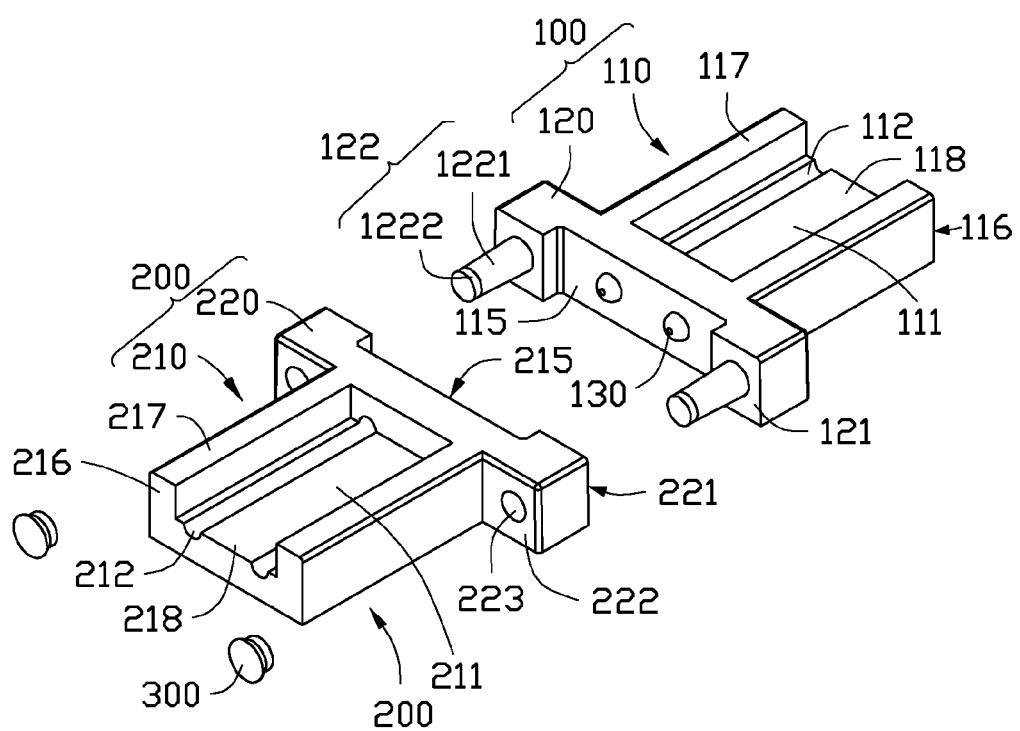
FIG. 2 is an exploded, isometric view of the optical fiber connector of FIG. 1.
Figure 3:
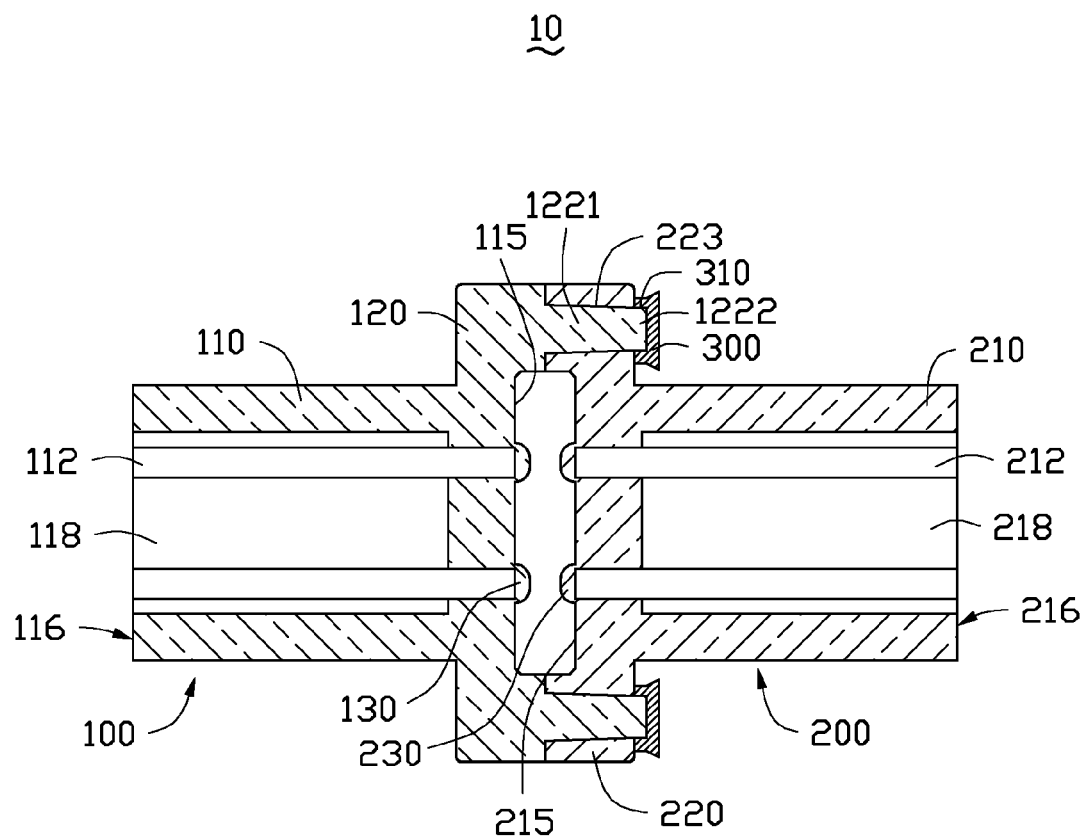
FIG. 3 is a cross-sectional view taken along line III-IIII of the optical fiber connector of FIG. 1.

FIGS. 1-3 show an embodiment of an optical fiber connector 10. The optical connector 10 includes a first optical-electric coupling element 100, a second optical-electric coupling element 200, and two elastic location caps 300.

The first optical-electric coupling element 100 is made of a transparent material, such as a transparent rubber, and includes a first main body 110 and two first extension portions 120.

The first main body 110 includes a first side surface 115, a second side surface 116 facing away from the first side surface 115, and a first upper surface 117. The first side surface 115 is substantially parallel to the second side surface 116. The first upper surface 117 substantially perpendicularly connects the first side surface 115 to the second side surface 116.

The first optical-electric coupling element 100 also includes two first coupling lenses 130 formed on the first side surface 115. In one embodiment, all of the first coupling lenses 130 are convex lenses and are integrally formed with the first optical-electric coupling element 100.

The first upper surface 117 defines a first cavity 111. The first cavity 111 runs through the second side surface 116. The first cavity 111 includes a first bottom surface 118. The first bottom surface 118 defines two first semi-cylindrical receiving holes 112. Each first receiving hole 112 aligns with a first coupling lens 130. An axis of the first coupling lens 130 is substantially parallel to a lengthwise direction of the first receiving hole 112. Each first receiving hole 112 is configured to receive an optical fiber (not shown).

The two first extension portions 120 substantially perpendicularly extend upward from the first side surface 115. Each first extension portion 120 is located on one end portion of the first side surface 115. The two first coupling lenses 130 are located between the two first extension portions 120.

Each first extension portion 120 includes a first location surface 121 substantially parallel to the first side surface 115. Each first extension portion 120 includes a location post 122 substantially perpendicularly extending upward from the first location surface 121. Each location post 122 includes a conic portion 1221 and a cylindrical portion 1222 connected to the conic portion 1221. A diameter of the conic portion 1221 gradually reduces from an end of the conic portion 1221 connected to the first location surface 121 to the other end of the conic portion 1221 connected to the cylindrical portion 1222. A diameter of the cylindrical portion 1222 is substantially equal to a diameter of an end of the conic portion 1221 connected to the cylindrical portion 1222.

The second optical-electric coupling element 200 is also made of a transparent material, such as a transparent rubber, and includes a second main body 210 and two second extension portions 220.

The second main body 210 includes a third side surface 215, a fourth side surface 216 facing away from the third side surface 215, and a second upper surface 217. The third side surface 215 is substantially parallel to the fourth side surface 216. The second upper surface 217 substantially perpendicularly connects the third side surface 215 to the fourth side surface 216.

The second optical-electric coupling element 200 also includes two second coupling lenses 230 formed on the third side surface 215. In one embodiment, all of the second coupling lenses 230 are convex lenses and are integrally formed with the second optical-electric coupling element 200.

The second upper surface 217 defines a second cavity 211. The second cavity 211 runs through the fourth side surface 216. The second cavity 211 includes a second bottom surface 218. The second bottom surface 218 defines two second semi-cylindrical receiving holes 212. Each second receiving hole 212 aligns with a second coupling lens 230. An axis of the second coupling lens 230 is substantially parallel to a lengthwise direction of the second receiving hole 212. Each second receiving hole 212 is configured to receive an optical fiber (not shown).

The two second extension portions 220 substantially perpendicularly extend upward from the third side surface 215. Each second extension portion 220 is located on one end portion of the third side surface 215. The two second coupling lenses 230 are located between the two second extension portions 220.

Each second extension portion 220 includes a second location surface 221 and a third location surface 222 facing away from the second location surface 221. The second location surface 221 is substantially parallel to the second side surface 215 and the first second location surface 121. The third location surface 222 is substantially parallel to the second location surface 221.

Each second extension portion 220 defines a location hole 223 running through the second location surface 221 and the third location surface 222. Each location hole 223 spatially corresponds to a corresponding location post 122. A shape and a size of the location hole 223 respectively corresponds to a shape and a size of the conic portion 1221. In one embodiment, the locating hole 223 is also conic. A diameter of the location hole 223 gradually reduces from the second location surface 221 to the third location surface 222, and a length of the location hole 223 is substantially equal to a length of the conic portion 1221 along a direction perpendicular to the first location surface 121, as such, the locating hole 223 matches with the conic portion 1221.

The elastic location cap 300 is made of rubber, and defines a receiving hole 310. The receiving hole 310 is a blind hole. A shape and a size of the receiving hole 310 respectively corresponds to a shape and a size of the cylindrical portion 1222 of the location post 122. A length of the receiving hole 310 is substantially equal to a length of the cylindrical portion 1222 along a direction perpendicular to the first location surface 121, as such, the receiving hole 310 matches with the cylindrical portion 1222.

When assembling, the locating posts 122 are inserted into the location holes 223 to attach the first optical-electric coupling element 100 to the second optical-electric coupling element 200. Each conic portion 1221 is tightly received in a location hole 223, with the first location surface 121 tightly contacting with the second location surface 221, and with each first coupling lens 130 being aligned with a second coupling lens 230. The cylindrical portion 1222 is totally exposed out of the location hole 223, the cylindrical portion 1222 is received in the receiving hole 310. This can prevent the location posts 122 from being slid out of the location hole 223, as such, improving coupling precision between the first optical-electric coupling element 100 and the second optical-electric coupling element 200.

In other embodiments, the numbers of the first coupling lenses 130 and the second coupling lenses 230 can be changed depending on need. The numbers of the first receiving hole 112 and the second receiving hole 212 will change correspondingly.

In other embodiments, the numbers of location posts 122 and the receiving holes 230 will change correspondingly.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An optical fiber connector, comprising:
a first optical-electric coupling element comprising a location post;
a second optical-electric coupling element defining a location hole; and
an elastic location cap, the elastic location cap defining a receiving hole; wherein a length of the location post is greater than a length of the location hole, the location post is inserted into the location post to assemble the first optical-electric coupling element to the second optical-electric coupling element, with an exposed portion of the location post exposing out of the location hole, the elastic location cap capping the location post with the exposed portion received in the receiving hole.

2. The optical fiber connector of claim 1, wherein the elastic location cap is made of rubber.

3. The optical fiber connector of claim 1, wherein the first optical-electric coupling element comprises a first main body, the first main body comprises a first side surface and a second side surface facing away from the first side surface, the first optical-electric coupling element comprises a first coupling lens formed on the first side surface, the second optical-electric coupling element comprises a second main body, the second main body comprises a third side surface and a fourth side surface facing away from the third side surface, the second optical-electric coupling element comprises a second coupling lens formed on the third side surface, the first coupling lens aligns with the second coupling lens.

4. The optical fiber connector of claim 3, wherein the first coupling lens is a convex lens and is integrally formed with the first optical-electric coupling element, the second coupling lens is a convex lens and is integrally formed with the second optical-electric coupling element.

5. The optical fiber connector of claim 3, wherein the first main body comprises a first upper surface substantially perpendicularly connecting the first side surface to the second side surface, the first upper surface defines a first cavity, the first cavity runs through the second side surface, the first cavity comprises a first bottom surface, the first bottom surface defines a first semi-cylindrical receiving hole, the semi-cylindrical first receiving hole aligns with the first coupling lens.

6. The optical fiber connector of claim 5, wherein an axis of the first coupling lens is substantially parallel to a lengthwise direction of the first receiving hole.

7. The optical fiber connector of claim 3, wherein the second main body comprises a second upper surface substantially perpendicularly connecting the third side surface to the fourth side surface, the second upper surface defines a second cavity, the second cavity runs through the fourth side surface, the second cavity comprises a second bottom surface, the second bottom surface defines a second semi-cylindrical receiving hole, the second semi-cylindrical receiving hole aligns with the first coupling lens.

8. The optical fiber connector of claim 7, wherein an axis of the second coupling lens is substantially parallel to a lengthwise direction of the second receiving hole.

9. The optical fiber connector of claim 3, wherein the first optical-electric coupling element comprises two first extension portions substantially perpendicularly extending from the first side surface, each first extension portion is located on one end portion of the first side surface, each first extension portion comprises a first location surface substantially parallel to the first side surface, the location post substantially perpendicularly extending from the first location surface.

10. The optical fiber connector of claim 9, wherein the second optical-electric coupling element comprises two second extension portions substantially perpendicularly extending from the third side surface, each second extension portion is located on one end portion of the third side surface, each second extension portion comprises a second location surface and a third location surface facing away from the second location surface, the second location surface is substantially parallel to the second side surface and the first second location surface, the third location surface is substantially parallel to the second location surface, the first location surface tightly contacts with the second location surface.

11. The optical fiber connector of claim 10, wherein each second extension portion defines a location hole running through the second location surface and the third location surface, the location hole spatially corresponds to the location post.

12. The optical fiber connector of claim 11, wherein the location post comprises a conic portion and a cylindrical portion connected to the conic portion, the cylindrical portion is the exposed portion, a diameter of the conic portion gradually reduces from an end of the conic portion connected to the first location surface to the other end of the conic portion connected to the cylindrical portion, a diameter of the cylindrical portion is substantially equal to a diameter of an end of the conic portion connected to the cylindrical portion, a shape and a size of the location hole respectively correspond to a shape and a size of the conic portion, the locating hole is conic, a diameter of the location hole gradually reduces from the second location surface to the third location surface, and a length of the location hole is substantially equal to a length of the conic portion along a direction perpendicular to the first location surface.

13. The optical fiber connector of claim 12, wherein a shape and a size of the receiving hole respectively corresponds to a shape and a size of the cylindrical portion of the location post, a length of the receiving hole is substantially equal to a length of the cylindrical portion along a direction perpendicular to the first location surface.

* * * * *